United States Patent
Huang et al.

(10) Patent No.: US 12,386,438 B2
(45) Date of Patent: Aug. 12, 2025

(54) ELECTRONIC STYLUS AND ELECTRONIC DEVICE

(71) Applicant: SHENZHEN QIANFENYI INTELLIGENT TECHNOLOGY CO., LTD, Shenzhen (CN)

(72) Inventors: Yanxin Huang, Shenzhen (CN); Liangwu Chen, Shenzhen (CN); Ziyu Zhan, Shenzhen (CN)

(73) Assignee: SHENZHEN QIANFENYI INTELLIGENT TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/658,799

(22) Filed: May 8, 2024

(65) Prior Publication Data

US 2024/0288954 A1    Aug. 29, 2024

Related U.S. Application Data

(63) Continuation of application No. PCT/CN2023/103283, filed on Jun. 28, 2023.

(30) Foreign Application Priority Data

Nov. 17, 2022 (CN) .......................... 202223060029.8

(51) Int. Cl.
   *G06F 3/0354* (2013.01)
(52) U.S. Cl.
   CPC ................................ *G06F 3/03545* (2013.01)
(58) Field of Classification Search
   CPC ....... G06F 3/03545; G06F 3/0354; G01L 1/22
   See application file for complete search history.

(56) References Cited

U.S. PATENT DOCUMENTS

| | | | |
|---|---|---|---|
| 11,379,058 B1* | 7/2022 | Clements | G06F 3/0346 |
| 2021/0382566 A1 | 12/2021 | Wong et al. | |
| 2024/0201806 A1* | 6/2024 | Zhao | G06F 3/0441 |

FOREIGN PATENT DOCUMENTS

| | | | | |
|---|---|---|---|---|
| CN | 113190127 A | | 7/2021 | |
| CN | 113311952 A | * | 8/2021 | G06F 3/03545 |

(Continued)

OTHER PUBLICATIONS

International Search Report and Written Opinion issued in corresponding PCT Application No. PCT/CN2023/103283, dated Sep. 13, 2023.

*Primary Examiner* — Temesghen Ghebretinsae
*Assistant Examiner* — Ivelisse Martinez Quiles
(74) *Attorney, Agent, or Firm* — Westbridge IP LLC

(57) ABSTRACT

Disclosed are an electronic stylus and an electronic device. The electronic stylus includes: a pen casing and a stress transmitting structure provided in the pen casing; the stress transmitting structure includes a strain piece and a pen core bracket connected to the pen core; the strain piece includes a fixed section, a stress section and a detecting section, and the stress section and the detecting section are respectively connected to two ends of the fixed section and are bent and extended; the pen core bracket is configured to run through the stress section and is connected to the stress section and the detecting section, and the detecting section is provided with a strain gauge; and the fixed section is configured to extend toward a stress direction of the pen core, and the fixed section is welded to an inner wall of the pen casing.

11 Claims, 5 Drawing Sheets

(56) References Cited

FOREIGN PATENT DOCUMENTS

| | | |
|---|---|---|
| CN | 114253407 A | 3/2022 |
| CN | 218974891 U | 5/2023 |
| EP | 2813918 A1 | 12/2014 |

* cited by examiner

ELECTRONIC STYLUS AND ELECTRONIC DEVICE

CROSS-REFERENCE TO RELATED APPLICATIONS

The present application is a continuation application of International Application No. PCT/CN2023/103283, filed on Jun. 28, 2023, which claims priority to Chinese Patent Application No. 202223060029.8, filed on Nov. 17, 2022. The disclosures of the above-mentioned applications are incorporated herein by reference in their entireties.

TECHNICAL FIELD

The present application relates to the technical field of touch, and in particular to an electronic stylus and an electronic device.

BACKGROUND

The electronic stylus is a small pen-shaped tool used to input commands into the computer screen, the mobile device, the graphics tablet, or other devices with the touch screen. Users can tap the touch screen with the stylus to select a file or to draw. In order to achieve the good writing performance of the electronic stylus, the distance between the electrode structures, the signal shielding between the electrodes, and the size of the electrodes of the electronic stylus are relatively required strictly.

In related art, the existing electronic stylus usually is provided with a stress transmitting structure connected to the pen core to sense the stress of the pen core, so as to draw different handwriting with various thickness on the display. However, the existing stress transmitting structure is mostly a parallelogram frame structure. In order to ensure the sensitivity and stability, the size of the quadrilateral frame structure can not be too small, which occupies a large amount of the internal space, causing the waste of internal space, and the utilization rate of the internal space is low.

SUMMARY

The main purpose of the present application is to provide an electronic stylus and an electronic device, aiming to solve the problem that the stress transmitting structure occupies a large amount of the internal space in the electronic stylus.

To achieve the above purpose, the present application provides an electronic stylus, including:
  a pen casing provided with a pen core for making a touch screen produce an electrical signal in response to being in contact with the touch screen; and
  a stress transmitting structure provided in the pen casing;
  the stress transmitting structure includes a strain piece and a pen core bracket connected to the pen core;
  the strain piece includes a fixed section, a stress section and a detecting section, and the stress section and the detecting section are respectively connected to two ends of the fixed section and are bent and extended; the pen core bracket is configured to run through the stress section and is connected to the stress section and the detecting section, and the detecting section is provided with a strain gauge; and
  the fixed section is configured to extend toward a stress direction of the pen core, and the fixed section is welded to an inner wall of the pen casing.

In an embodiment, the pen core bracket includes a connecting pipe, a first bracket, a second bracket and a third bracket; the connecting pipe is connected to the pen core, and the connecting pipe is connected to the first bracket; two ends of the second bracket are vertically connected to the first bracket and the third bracket respectively;
  the stress section is provided with a connecting hole for the connecting pipe to run through, and the connecting pipe is configured to run through the connecting hole; and
  the first bracket is connected to the stress section, and the third bracket is connected to the detecting section.

In an embodiment, a first flange is extended from a bottom of the first bracket and is connected to the stress section.

In an embodiment, a second flange is extended from a bottom of the third bracket and is connected to the detecting section.

In an embodiment, the stress section is perpendicular to the fixed section, and the detecting section is perpendicular to the fixed section.

In an embodiment, the stress section, the fixed section, the detecting section are all arranged in sheet shape.

In an embodiment, the inner wall of the pen casing includes a shielding steel pipe arranged in ring shape, and the fixed section is welded on an inner wall of the shielding steel pipe.

In an embodiment, a material of the pen core bracket is metal.

In an embodiment, the pen casing is further provided with a control mainboard electrically connected to the strain gauge.

In an embodiment, an end portion of the pen core is rounded up.

The present application also provides an electronic device, including:
  a touch screen and the electronic stylus, and the touch screen is configured for touching of the electronic stylus.

In the present application, the electronic stylus includes a pen casing and a stress transmitting structure. The pen casing is provided with a pen core for making the touch screen produce an electrical signal when it is contact with the touch screen. The transmitting structure is provided in the pen casing and includes a strain piece and a pen core bracket connected to the pen core. The strain piece includes a fixed section, a stress section and a detecting section, and the stress section and the detecting section are connected to two ends of the fixed section and are bent and extended. The pen core bracket runs through the stress section and is connected to the stress section and the detecting section. The detecting section is provided with a strain gauge. The fixed section extends towards a stress direction of the pen core, and is welded to the inner wall of the pen casing. In this way, on the premise of ensuring the stability and reliability of the stress transmitting structure, the current parallelogram frame structure is improved, the space utilization rate is improved, and more space is left for the rest of the parts.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
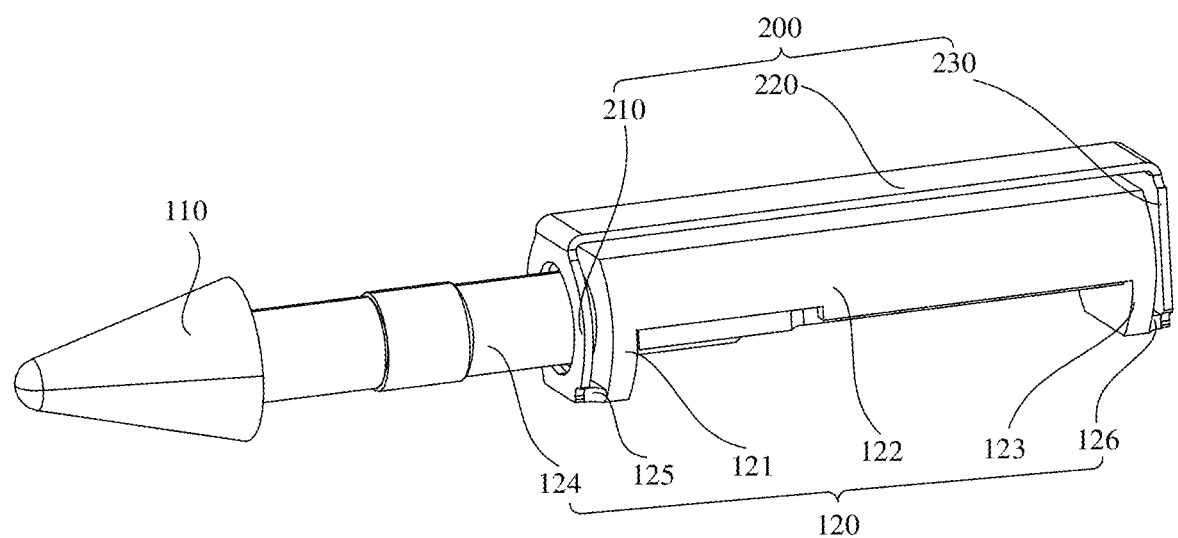
FIG. 1 is a schematic structural view of a pen core, a strain piece and a pen core bracket of an electronic stylus according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The electronic stylus is a small pen-shaped tool used to input commands into the computer screen, the mobile device, the graphics tablet, or other devices with the touch screen. Users can tap the touch screen with the stylus to select a file or to draw. In order to achieve the good writing performance of the electronic stylus, the distance between the electrode structures, the signal shielding between the electrodes, and the size of the electrodes of the electronic stylus are relatively required strictly.

In related art, the existing electronic stylus usually is provided with a stress transmitting structure connected to the pen core to sense the stress of the pen core, so as to draw different handwriting with various thickness on the display. However, the existing stress transmitting structure is mostly a parallelogram frame structure. In order to ensure the sensitivity and stability, the size of the quadrilateral frame structure cannot be too small, which occupies a large amount of the internal space, causing the waste of internal space and the low utilization rate of the internal space.

Referring to FIG. 1 to FIG. 5, the present application provides an electronic stylus.

The electronic stylus includes a pen casing and a stress transmitting structure. The pen casing 100 is provided with a pen core 110 configured for making the touch screen produce an electrical signal when it is in contact with the touch screen. The stress transmitting structure is provided in the pen casing 100 and includes a strain piece 200 and a pen core bracket 120 connected to the pen core 110. The strain piece 200 includes a fixed section 220, a stress section 210 and a detecting section 230, and the stress section 210 and the detecting section 230 are connected to two ends of the fixed section 220 and are bent and extended. The pen core bracket 120 runs through the stress section 210 and is connected to the stress section 210 and the detecting section 230, and the detecting section 230 is provided with a strain gauge 231. The fixed section 220 extends toward a stress direction of the pen core 110, and the fixed section 220 is welded on an inner wall of the pen casing 100.

Specifically, the strain piece 200 is a sensitive force-bearing part, and the strain piece 200 will produce relatively obvious deformation after being stressed. The strain piece 200 is pasted with the strain gauge 231, thus the deformation can be detected, so as to calculate the magnitude of the force. When writing with the pen core 110, the pen core 110 is squeezed by the touch screen, and the force is transmitted to the stress section 210, the fixed section 220, and the detecting section 230 of the strain piece 200 through the pen core bracket 120 in the pen casing 100 connected to the pen core 110. The upper surface of the fixed section 220 of the strain piece 200 extending towards the stress direction of the pen core 110 is welded to the inner wall of the pen casing 100, so that the fixed section 220 of the strain piece 200 is fixed. Due to the elasticity of the strain piece 200, the deformation of the strain piece 200 in the detecting section 230 is detected by the strain gauge 231, and the deformation of the strain gauge 231 is calculated, so that the thickness of the handwriting of the electronic stylus on the touch screen can be adjusted according to the deformation calculated by the strain gauge 231. In this way, on the premise of ensuring the stability and reliability of the stress transmitting structure, the current parallelogram frame structure is improved. The pen core bracket 120 runs through the stress section 210 of the strain piece 200 and extends into the opening space of the strain piece 200, and part of the pen core bracket 120 is accommodated in the open space, which improves the utilization rate of the internal space and leaves more space for the rest of the parts.

Figure 4:
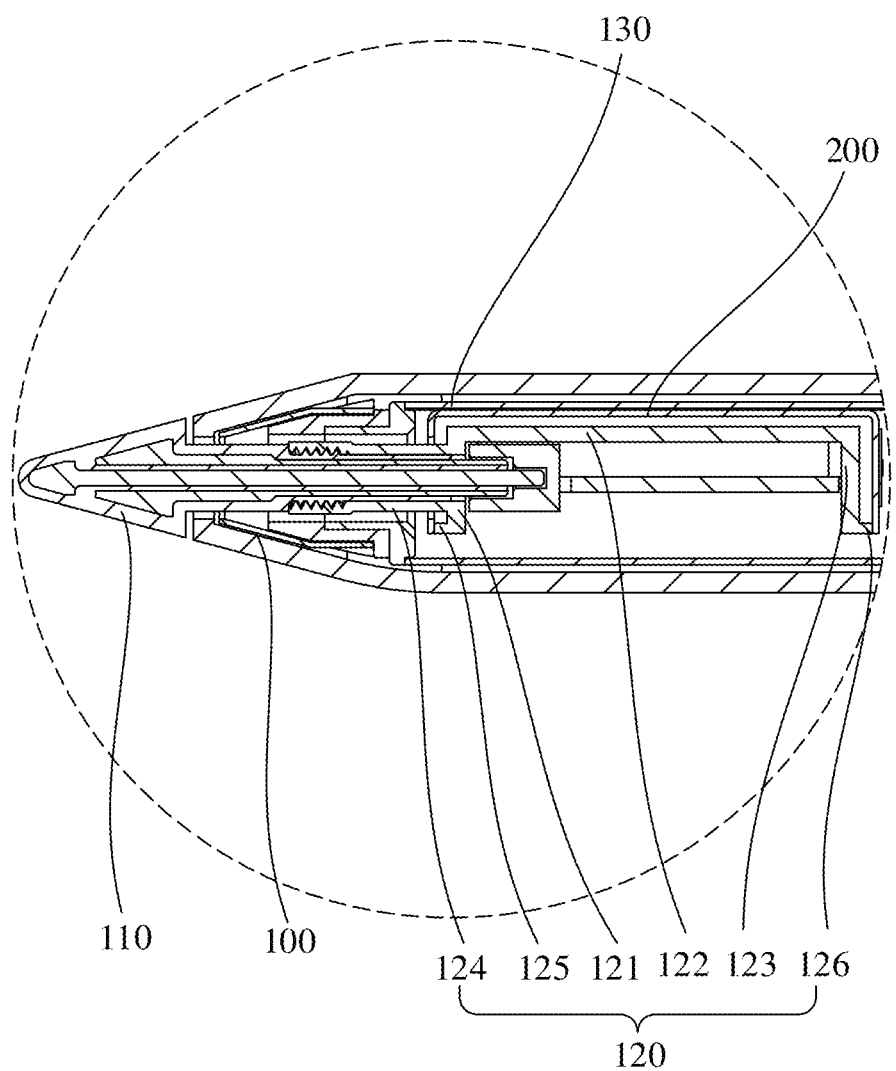
FIG. 4 is a partial sectional view of the electronic stylus according to an embodiment of the present application.

Referring to FIG. 1 and FIG. 4, in an embodiment, the pen core bracket 120 includes a connecting pipe 124, a first bracket 121, a second bracket 122 and a third bracket 123. The connecting pipe 124 is connected to the pen core 110, and the connecting pipe 124 is connected to the first bracket 121. Two ends of the second bracket 122 are vertically connected to the first bracket 121 and the third bracket 123 respectively. The stress section 210 is provided with a connecting hole 211 for the connecting pipe 124 to penetrate, and the connecting pipe 124 penetrates the connecting hole 211. The first bracket 121 is connected to the stress section 210, and the third bracket 123 is connected to the detecting section 230. In this way, the stress transmitting structure is formed with a double-layer frame structure with openings, which ensures the stability of the stress transmitting structure and reduces the space occupancy of the stress transmitting structure.

Figure 2:
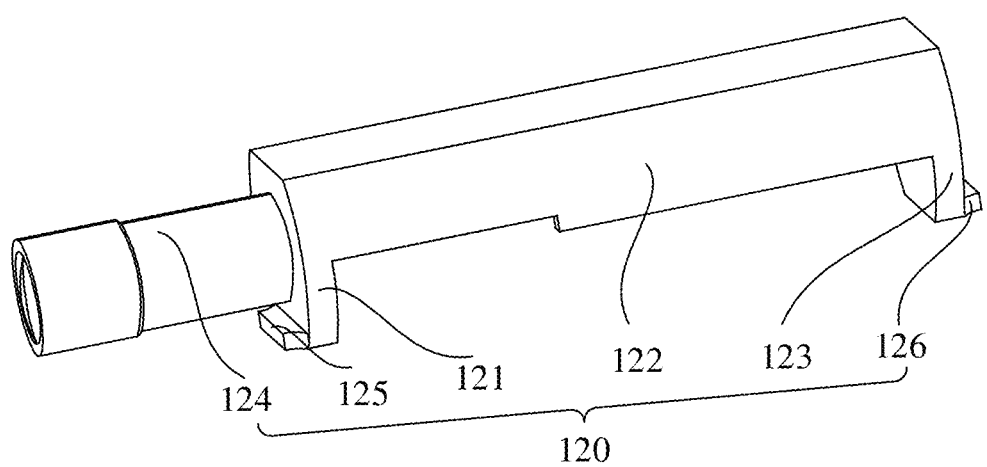
FIG. 2 is a schematic structural view of the pen core bracket of the electronic stylus according to an embodiment of the present application.

Referring to FIG. 1 to FIG. 2, in an embodiment, a first flange 125 is extended from the bottom of the first bracket 121 and is connected to the stress section 210, and/or the second flange 126 is extended from the bottom of the third bracket 123 and is connected to the second detecting section 230. It should be understood that the first flange 125 is extended from the bottom of the first bracket 121 and is connected to the stress section 210, or the second flange 126 is extended from the bottom of the third bracket 123 and is connected to the second detecting section 230, or the first flange 125 is extended from the bottom of the first bracket 121 and is connected to the stress section 210, and the second flange 126 is extended from the bottom of the third bracket 123 and is connected to the second detecting section 230. Through the first flange 125 and the second flange 126, the stress sensitivity of the strain piece 200 is increased, and the detection accuracy of the strain gauge 231 is ensured.

Figure 3:
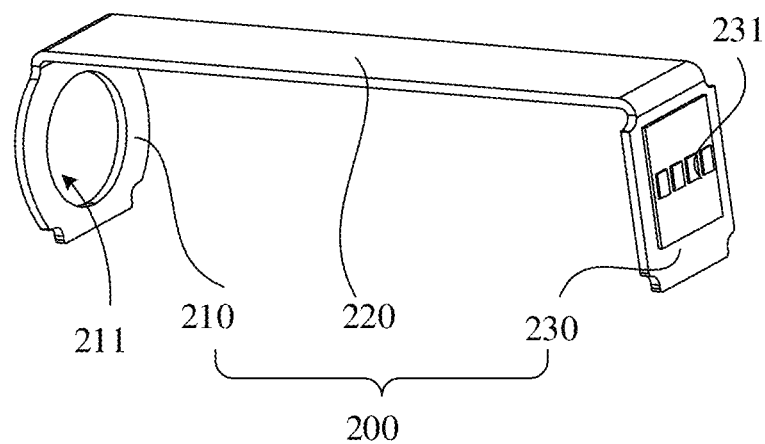
FIG. 3 is a schematic structural view of the strain piece of the electronic stylus according to an embodiment of the present application.

Referring to FIG. 3, in an embodiment, the stress section 210 is perpendicular to the fixed section 220, and the detecting section 230 is perpendicular to the fixed section 220, which maximizes the internal space of the pen casing 100 and reduces the space occupation of the strain piece 200. In other embodiments, the angle between the stress section 210 and the fixed section 220 can also be 80 degrees, 70 degrees, etc., and the angle between the detecting section 230 and the fixed section 220 can also be 80 degrees, 70 degrees, etc.

Referring to FIG. 3, in an embodiment, the stress section 210, the fixed section 220, and the detecting section 230 are all arranged in a sheet form. The size of the strain piece 200 is minimized by the square sheet form, and the internal space of the pen casing 100 is less occupied.

Referring to FIG. 4, in an embodiment, the inner wall of the pen casing 100 includes a shielding steel pipe 130 arranged in a ring shape, and the fixed section 220 is welded on the inner wall of the shielding steel pipe 130. It should be understood that the shielding steel pipe 130 can play a role in signal shielding and isolation, reduce signal divergence, and improve the signal interaction ability between the electrodes in the electronic stylus and the touch screen. When the pen is used to write, the pen core 110 is stressed and the force is transferred to the pen core bracket 120, and the pen core bracket 120 transfers the deformation from the part welded with the strain piece 200, that is, the stress section 210, to the strain piece 200. The upper surface of the fixed section 220 of the strain piece 200 is rigidly welded with the shielding steel pipe 130, so that the flat part of strain piece 200, that is, the fixed section 220, is fixed. Since the pen core bracket 120 is stiffer than the strain piece 200 and the relative deformation is much smaller, only the strain piece 200 will eventually deform, and the strain gauge 231 can detect the amount of the deformation.

In order to ensure the accuracy of the strain gauge 231 arranged at the strain piece 200 to detect the degree of force on the pen core 110, the stiffness of the pen core bracket 120 should be ensured. In an embodiment, the material of the pen core bracket 120 is metal. In other embodiments, the pen core bracket 120 can also be made of materials with a certain rigidity.

In an embodiment, the pen casing 100 is also provided with a control mainboard electrically connected to the strain gauge 231. In this way, the strain gauge 231 sends a signal through the detected deformation to the control mainboard, which controls the thickness of the handwriting of the pen core 110 on the touch screen.

Figure 5:
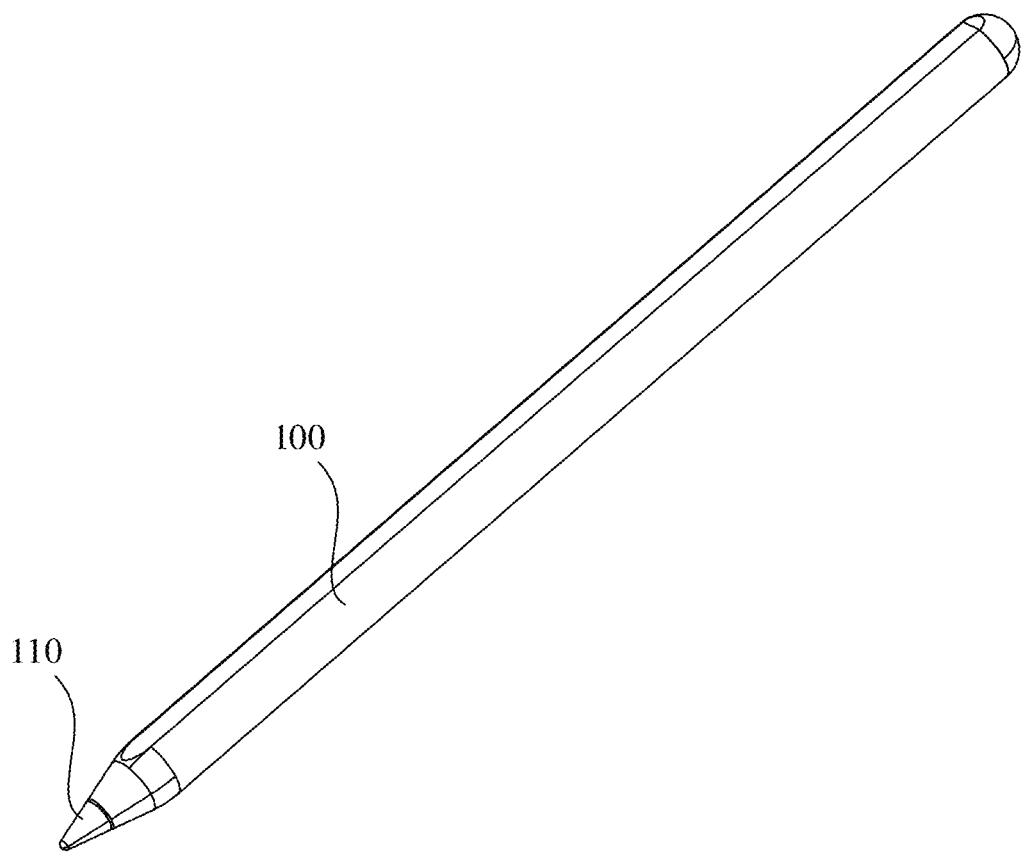
FIG. 5 is an exterior display view of the electronic stylus according to an embodiment of the present application.

Referring to FIG. 1 and FIG. 5, in an embodiment, the end portion of the pen core 110 is rounded up. If the end portion of the pen core 110 configured to contact the display is a sharp corner, the pen core 110 is stressed intensively and can easily scratch the display. The rounded corners allow for a smoother contact between the electronic stylus and the display, preventing scratches on the display.

Referring to FIG. 1 to FIG. 5, the present application also provides an electronic device including a display screen and an electronic stylus. The display screen is configured for the touching of the electronic stylus. The electronic stylus includes a pen casing and a stress transmitting structure. The pen casing 100 is provided with a pen core 110 for making the touch screen produce an electrical signal when it is contact with the touch screen. The stress transmitting structure is provided in the pen casing 100, and the stress transmitting structure includes a strain piece 200 and a pen core bracket 120 connected to the pen core 110. The strain piece 200 includes a fixed section 220, a stress section 210 and a detecting section 230, and the stress section 210 and the detecting section 230 are respectively connected to the two ends of the fixed section 220 and are bent and extended. The pen core bracket 120 runs through the stress section 210 and is connected to the stress section 210 and the detecting section 230. The detecting section 230 is provided with a strain gauge 231, and the fixed section 220 extends toward the stress direction of the pen core 110. The fixed section 220 is welded to the inner wall of the pen casing 100. Since the electronic device adopts all the technical solutions of all the above embodiments, it also has all the beneficial effects brought about by the technical solutions of the above embodiments, which will not be repeated here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields, are included in the scope of the present application.

What is claimed is:

1. An electronic stylus, comprising:
a pen casing provided with a pen core for making a touch screen produce an electrical signal in response to being in contact with the touch screen; and
a stress transmitting structure provided in the pen casing;
wherein the stress transmitting structure comprises a strain piece and a pen core bracket connected to the pen core;
the strain piece comprises a fixed section, a stress section and a detecting section, and the stress section and the detecting section are respectively connected to two ends of the fixed section and are bent and extended; the pen core bracket is configured to run through the stress section and is connected to the stress section and the detecting section, and the detecting section is provided with a strain gauge; and
the fixed section is configured to extend toward a stress direction of the pen core, and the fixed section is welded to an inner wall of the pen casing;
wherein the pen core bracket comprises a connecting pipe, a first bracket, a second bracket and a third bracket, the connecting pipe is connected to the pen core, the connecting pipe is configured to run through the stress section, the first bracket and the third bracket are connected to the second bracket and the strain piece to allow the stress transmitting structure form a double-layer frame structure with openings.

2. The electronic stylus of claim 1, wherein the connecting pipe is connected to the first bracket; two ends of the second bracket are vertically connected to the first bracket and the third bracket respectively;

the stress section is provided with a connecting hole for the connecting pipe to run through, and the connecting pipe is configured to run through the connecting hole; and the first bracket is connected to the stress section, and the third bracket is connected to the detecting section.

3. The electronic stylus of claim 2, wherein a first flange is extended from a bottom of the first bracket and is connected to the stress section.

4. The electronic stylus of claim 3, wherein a second flange is extended from a bottom of the third bracket and is connected to the detecting section.

5. The electronic stylus of claim 4, wherein the stress section is perpendicular to the fixed section, and the detecting section is perpendicular to the fixed section.

6. The electronic stylus of claim 5, wherein the stress section, the fixed section, the detecting section are all arranged in sheet shape.

7. The electronic stylus of claim 2, wherein the inner wall of the pen casing comprises a shielding steel pipe arranged in ring shape, and the fixed section is welded on an inner wall of the shielding steel pipe.

8. The electronic stylus of claim 1, wherein a material of the pen core bracket is metal.

9. The electronic stylus of claim 1, wherein the pen casing is further provided with a control mainboard electrically connected to the strain gauge.

10. The electronic stylus of claim 1, wherein an end portion of the pen core is rounded up.

11. An electronic device, comprising:

a touch screen and the electronic stylus of claim 1, wherein the touch screen is configured for touching of the electronic stylus.

* * * * *